(12) United States Patent
Kalman et al.

(10) Patent No.: US 12,332,488 B2
(45) Date of Patent: Jun. 17, 2025

(54) MICROLED PARALLEL OPTICAL INTERCONNECTS

(71) Applicant: AvicenaTech Corp., Sunnyvale, CA (US)

(72) Inventors: Robert Kalman, Mountain View, CA (US); Bardia Pezeshki, Mountain View, CA (US); Alexander Tselikov, Mountain View, CA (US); Cameron Danesh, Mountain View, CA (US)

(73) Assignee: AvicenaTech, Corp., Sunnyvale, CA (US)

( * ) Notice: Subject to any disclaimer, the term of this patent is extended or adjusted under 35 U.S.C. 154(b) by 125 days.

(21) Appl. No.: 17/820,483

(22) Filed: Aug. 17, 2022

(65) Prior Publication Data

US 2023/0054560 A1 Feb. 23, 2023

Related U.S. Application Data

(60) Provisional application No. 63/234,148, filed on Aug. 17, 2021.

(51) Int. Cl.
*G02B 6/42* (2006.01)

(52) U.S. Cl.
CPC ......... *G02B 6/4249* (2013.01); *G02B 6/4206* (2013.01); *G02B 6/4214* (2013.01); *G02B 6/4295* (2013.01)

(58) Field of Classification Search
CPC ................. G02B 6/42–43; G02B 2006/4297
See application file for complete search history.

(56) References Cited

U.S. PATENT DOCUMENTS

| | | | |
|---|---|---|---|
| 6,367,989 B1* | 4/2002 | Hartman | H04B 10/801 385/115 |
| 7,939,791 B1* | 5/2011 | Stone | G02B 6/4246 385/33 |
| 11,327,250 B1* | 5/2022 | Stone | G02B 6/40 |
| 11,402,585 B2* | 8/2022 | Tanaka | G02B 6/264 |

(Continued)

FOREIGN PATENT DOCUMENTS

| | | |
|---|---|---|
| JP | 2011-014932 A | 1/2011 |
| WO | WO-2023196121 A1 * | 10/2023 ............. H04B 10/40 |

OTHER PUBLICATIONS

International Search Report on PCT Application No. PCT/US2022/075090 from International Searching Authority (KIPO) dated Dec. 6, 2022.

(Continued)

*Primary Examiner* — Daniel Petkovsek
*Assistant Examiner* — Emma R. Oxford

(57) ABSTRACT

Parallel optical interconnects may be used to transmit signals produced by integrated circuits. A parallel optical interconnect may be in the form of a multicore optical fiber and one or more optical coupling assemblies optically connecting a first optical transceiver array and a second optical transceiver array. The multicore optical fiber may have multiple fiber elements with each having a core surrounded by cladding, and the one or more optical coupling assemblies may have refractive and/or reflective elements. In this way, light produced by one transceiver array may be transmitted through the multicore optical fiber and be received by the other transceiver array.

9 Claims, 12 Drawing Sheets

(56) References Cited

U.S. PATENT DOCUMENTS

| | | | | |
|---|---|---|---|---|
| 11,476,942 B2* | 10/2022 | Kalman | | H04B 10/40 |
| 11,677,472 B2* | 6/2023 | Kalman | | H04B 10/25 |
| | | | | 398/139 |
| 11,728,894 B2* | 8/2023 | Kalman | | H04B 10/40 |
| | | | | 398/135 |
| 11,764,878 B2* | 9/2023 | Pezeshki | | G02B 6/12021 |
| | | | | 398/164 |
| 11,791,901 B2* | 10/2023 | Kalman | | H04B 10/25 |
| 11,916,598 B2* | 2/2024 | Weverka | | H04B 10/25 |
| 11,949,455 B2* | 4/2024 | Kalman | | H04B 10/25 |
| 12,101,128 B2* | 9/2024 | Pezeshki | | H04B 10/803 |
| 2004/0159777 A1* | 8/2004 | Stone | | G02B 6/4246 |
| | | | | 250/216 |
| 2005/0224946 A1 | 10/2005 | Dutta | | |
| 2006/0249661 A1* | 11/2006 | Ishigami | | G02B 6/4206 |
| | | | | 250/216 |
| 2008/0317406 A1* | 12/2008 | Santori | | H04B 10/803 |
| | | | | 385/24 |
| 2012/0014645 A1* | 1/2012 | Kadar-Kallen | | G02B 6/32 |
| | | | | 385/74 |
| 2014/0348512 A1* | 11/2014 | Chaahoub | | H04B 10/801 |
| | | | | 398/139 |
| 2016/0246015 A1* | 8/2016 | Case | | G02B 6/4206 |
| 2016/0259133 A1* | 9/2016 | Kobayashi | | G02B 6/381 |
| 2016/0277098 A1* | 9/2016 | Decker | | H04B 10/03 |
| 2019/0049367 A1* | 2/2019 | Zou | | G01N 21/64 |
| 2019/0189603 A1 | 6/2019 | Wang et al. | | |
| 2020/0064563 A1* | 2/2020 | Kopp | | G02B 6/022 |
| 2020/0241208 A1 | 7/2020 | Kazmierski et al. | | |
| 2021/0003773 A1* | 1/2021 | Hayashi | | G02B 6/036 |
| 2021/0080664 A1 | 3/2021 | Pezeshki et al. | | |
| 2023/0232138 A1* | 7/2023 | Rivaud | | H04J 14/052 |
| | | | | 398/45 |
| 2023/0275390 A1* | 8/2023 | Ohtsuka | | G02B 6/32 |
| | | | | 359/341.1 |
| 2023/0299851 A1* | 9/2023 | Fryman | | H04B 10/502 |
| | | | | 398/115 |

OTHER PUBLICATIONS

Written Opinion on PCT Application No. PCT/US2022/075090 from International Searching Authority (KIPO) dated Dec. 6, 2022.

* cited by examiner

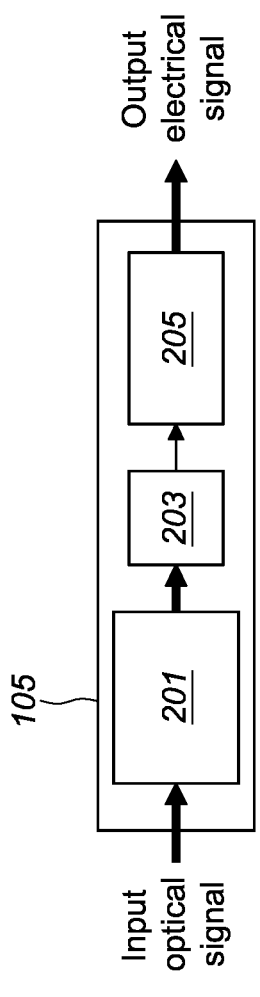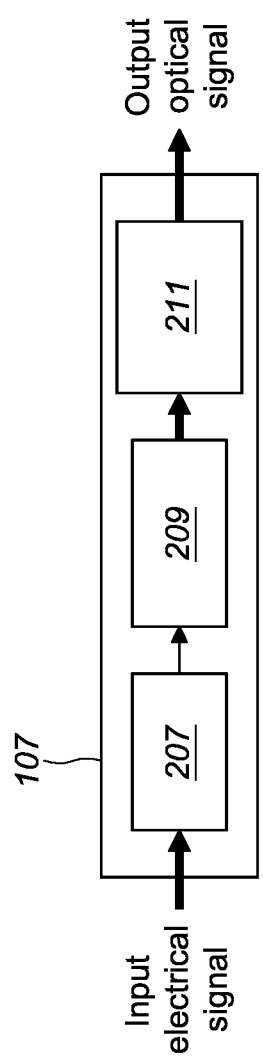

MICROLED PARALLEL OPTICAL INTERCONNECTS

CROSS-REFERENCE TO RELATED APPLICATION(S)

This application claims the benefit of U.S. Provisional Patent Application No. 63/234,148, filed on Aug. 17, 2021, the disclosure of which is incorporated by reference herein.

BACKGROUND OF THE INVENTION

Computing and networking performance requirements are seemingly ever-increasing.

Prominent applications driving these requirements include data center servers, high-performance computing clusters, artificial neural networks, and network switches.

For decades, dramatic integrated circuit (IC) performance and cost improvements were driven by shrinking transistor dimensions combined with increasing die sizes, summarized in the famous Moore's Law. Transistor counts in the billions have allowed consolidation onto a single system-on-a-chip (SoC) of functionality that was previously fragmented across multiple integrated circuits. However, Moore's Law appears to be reaching its limits as shrinking feature sizes below 10 nm results in decreasing marginal performance benefits with decreased yields and increased per-transistor costs.

Beyond these limitations, a single integrated circuit can only contain so much functionality, and that functionality is constrained because the integrated circuit's process cannot be simultaneously optimized for different functionality, e.g., logic, DRAM, and I/O. Increasingly, improving system performance is dependent on implementing very high bandwidth interconnects between multiple integrated circuits.

Unfortunately, compared to the on-chip connections, today's chip-to-chip connections are typically much less dense and require far more power (for example normalized as energy per bit). These inter-IC connections are currently significantly limiting system performance. Specifically, the power, density, latency, and distance limitations of interconnects are far from what is desired.

New interconnect technologies that provide significant improvements in multiple performance aspects are highly desirable. It is well-known that optical interconnects may have fundamental advantages over electrical interconnects, even for relatively short interconnects of <<<1 meter. Unfortunately, implementation of optical interconnects for inter-IC connections may face a host of problems. Included in these problems is that of coupling light from one integrated circuit to another integrated circuit. Electrical interconnect technology for inter-IC communications at a substrate or circuit board level may be relatively well-developed. The same may not be as true for optical interconnect technology for inter-IC communications, particularly for high-throughput applications that preferably do not negatively impact existing modes of electrical interconnections.

BRIEF SUMMARY OF THE INVENTION

Some embodiments in accordance with aspects of the invention include parallel optical interconnect assembly for optically coupling integrated circuits, comprising: a first optical transceiver array having a plurality of optical transmitters; the plurality of optical transmitters each having a drive circuit connected to a microLED; a multicore optical fiber configured to transmit light emitted by each microLED of the plurality of optical transmitters; a first optical coupling assembly to couple light to the first end of the multicore optical fiber, the first optical coupling assembly having a first refractive lens separated from the first optical transceiver array by a first distance equaling to a first focal length of the first refractive lens, a second refractive lens separated from a first end of the multicore optical fiber by a second distance equaling to a second focal length of the second refractive lens, with the first and second refractive lenses being separated from each other by a third distance equal to the first distance and the second distance combined; a second optical transceiver array having a plurality of optical receivers; each of the plurality of optical receivers having a photodetector connected to a receiver circuit; and a second optical coupling assembly having one or more refractive collectors configured to direct light transmitted from a second end of the multicore optical fiber to each photodetector of the plurality of optical receivers.

In some embodiments the first optical coupling assembly further comprises a reflecting element between the first optical transceiver array and the first refractive lens.

In some embodiments the reflective element is a turning mirror orientated 45 degrees relative to a normal axis of each microLED of the plurality of optical transmitters.

In some embodiments the multicore optical fiber comprises at least two segments that are joined by a junction.

In some embodiments the junction comprises an optical connector and a connector sleeve.

In some embodiments each photodetector of the plurality of optical receivers are monolithically integrated on an integrated circuit.

In some embodiments each photodetector of the plurality of optical receivers are bonded to an integrated circuit.

In some embodiments the multicore optical fiber comprises a bundle of multiple fiber elements, each fiber element having a core surrounded by cladding.

In some embodiments the multicore optical fiber comprises a bundle of multiple fiber elements, each fiber element having a core surrounded by a concentric cladding. In some such embodiments a space between the multiple fiber elements contain a filler material. In some such embodiments a space between the multiple fiber elements is empty.

In some embodiments each microLED of the plurality of optical transmitters is coupled to multiple cores of the multicore optical fiber.

In some embodiments each microLED of the plurality of optical transmitters is coupled to a single core of the multicore optical fiber.

BRIEF DESCRIPTION OF THE FIGURES

FIG. 2A is a block diagram of the different components of a receiver element, in accordance with aspects of the invention.

FIG. 2B is a block diagram of the different components of a transmitter element, in accordance with aspects of the invention.

DETAILED DESCRIPTION

Figure 1:
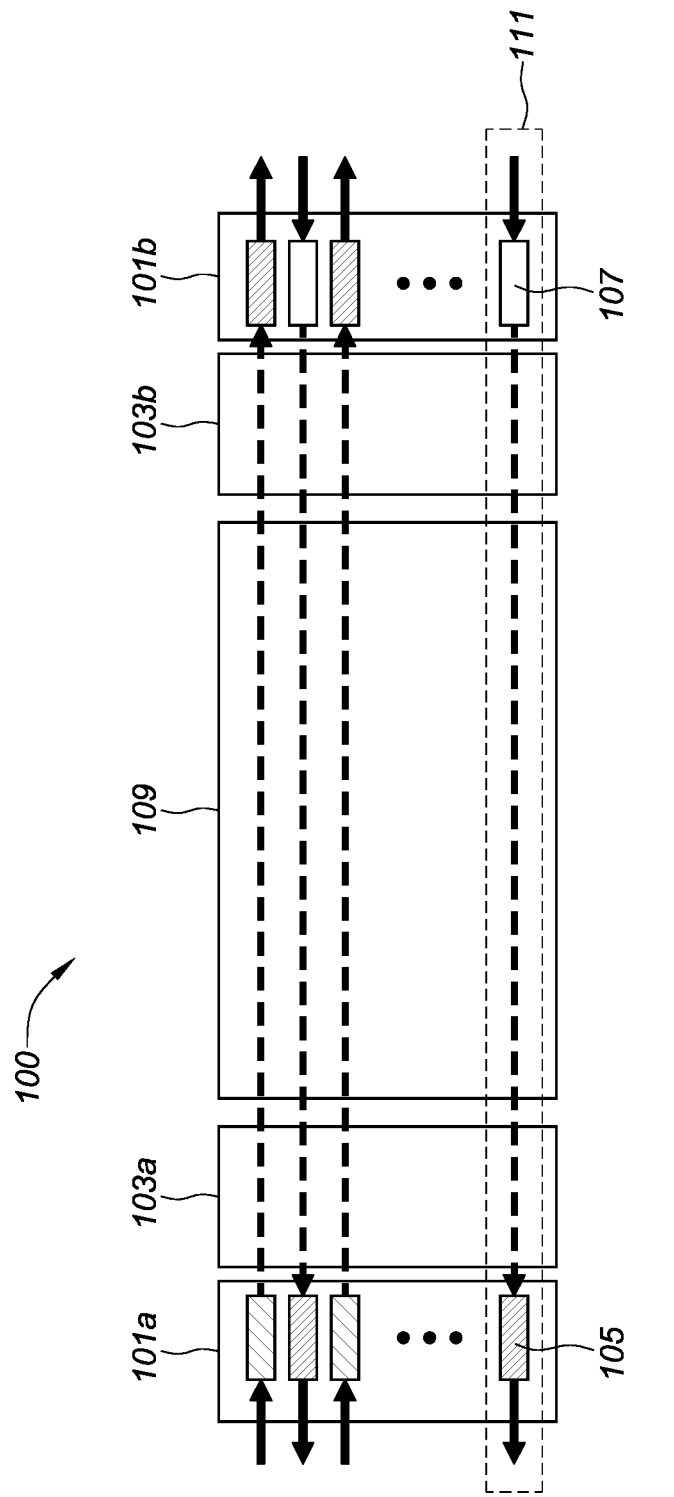
FIG. 1 is a block diagram of components of a parallel optical interconnect, in accordance with aspects of the invention.

FIG. 1 shows different components of a parallel optical interconnect 100. In some embodiments, a parallel optical interconnect comprises: a first optical transceiver array 101a, where the transceiver array comprises a plurality of optical transmitters 107 and optical receivers 105, where each optical transmitter comprises a micro light emitting diode (microLED); an optical coupling assembly 103a that couples light between the first optical transceiver array and a first end of a multicore optical fiber 109; a multicore optical fiber; a second optical transceiver array 101b the same as or similar to the first; and a second optical coupling assembly 103b the same as or similar to the first, which couples light between the second optical transceiver array and a second end of the multicore optical fiber (FIG. 1). The parallel optical interconnect comprises multiple "lanes" 111, where each lane comprises one transmitter in one transceiver array whose output light is relayed via coupling optics and the multicore optical fiber to a receiver in the other transceiver array. In some embodiments, a parallel optical interconnect comprises 32 to 1024 lanes. In some embodiments, each parallel optical interconnect lane has a throughput in the range of 1 Gbps to 10 Gbps.

FIG. 2A shows a block diagram of the different components of a receiver element. In some embodiments, each receiver 105 in an optical transceiver array comprises collector optics 201, a photodetector 203, and a receiver circuit 205. The collector optics may collect or direct light to the photodetector, and the receiver circuit may amplify and, in some embodiments, otherwise process electrical signals generated by the photodetector. FIG. 2B shows a block diagram of the different components of a transmitter element. In some embodiments, each transmitter 107 in an optical transceiver array comprises a drive circuit 207, a microLED 209, and an optical collector 211, where the output optical power of the microLED is modulated by the drive circuit based on the electrical input signal to the drive circuit. The optical collector may collect or direct light from the microLED into a fiber, or multiple fibers, of a multicore optical fiber. In some embodiments the microLED is made from a p-n junction of a direct-bandgap semiconductor material. In some embodiments, the microLED is made from GaN. In some embodiments, the microLED are made from GaAs. In some embodiments, the microLED is made from InP.

In some embodiments a microLED is distinguished from a semiconductor laser (SL) as follows: (1) a microLED does not have an optical resonator structure; (2) the optical output from a microLED is almost completely spontaneous emission, whereas the output from a SL is dominantly stimulated emission; (3) the optical output from a microLED is temporally and spatially incoherent, whereas the output from a SL has significant temporal and spatial coherence; (4) a microLED is designed to be driven down to a zero minimum current, whereas a SL is designed to be driven down to a minimum threshold current, which is typically at least 1 mA.

In some embodiments a microLED is distinguished from a standard LED by (1) having an emitting region of less than 10 $\mu m \times 10$ $\mu m$; (2) frequently having cathode and anode contacts on top and bottom surfaces, whereas a standard LED typically has both positive and negative contacts on a single surface; (3) typically being used in large arrays for display and interconnect applications.

In some embodiments, each microLED used in a parallel optical interconnect is driven with a current in the range of 10 uA to 1 mA. In some embodiments, the per-bit energy consumed by each lane of a parallel optical interconnect is in the range of 0.05 pJ/bit to 1 pJ/bit.

Figure 3A:
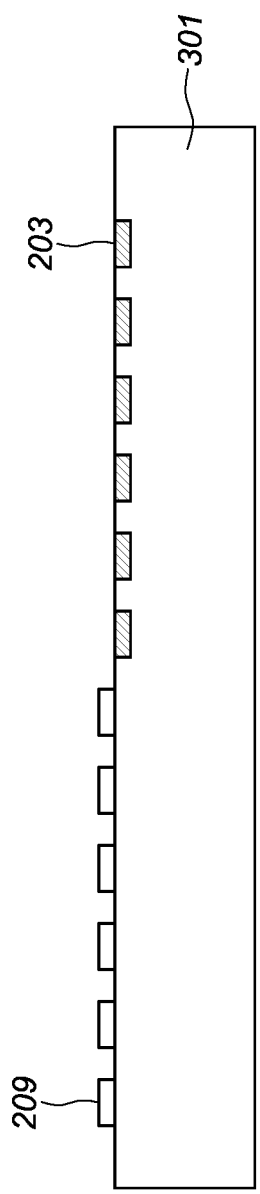
FIG. 3A shows an example of microLEDs and photodetectors integrated with an integrated circuit, in accordance with aspects of the invention.
Figure 3B:
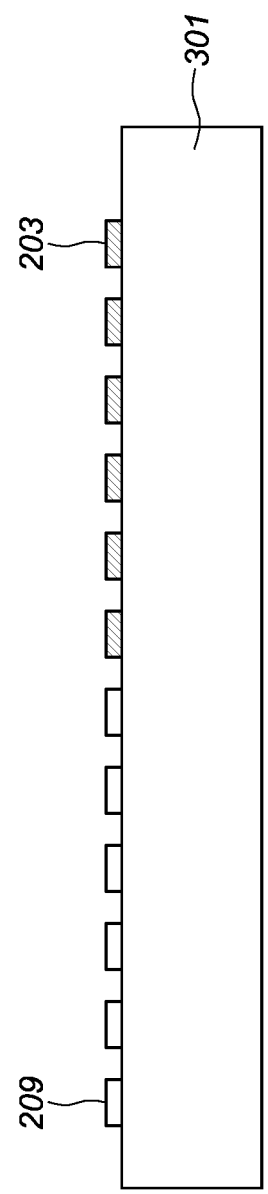
FIG. 3B shows another example of microLEDs and photodetectors integrated with an integrated circuit, in accordance with aspects of the invention.

FIGS. 3A-B show different examples of the microLEDs 209 and photodetectors 203 incorporated with an integrated circuit 301. In some embodiments, the transceiver array for a parallel optical interconnect comprises an integrated circuit to which microLEDs are bonded, for instance using solder bonding or direct metal-metal bonding. In some embodiments, photodetectors are monolithically integrated onto the integrated circuit, as shown in FIG. 3A. In some embodiments, photodetectors are also bonded to the integrated circuit, for instance using solder bonding, direct bonding, or epoxy bonding, as shown in FIG. 3B. In some embodiments, an integrated circuit may comprise one or more transceiver arrays, and may also comprise a variety of other circuitry for input/output (IO), computation, switching, and/or memory.

Figure 4:
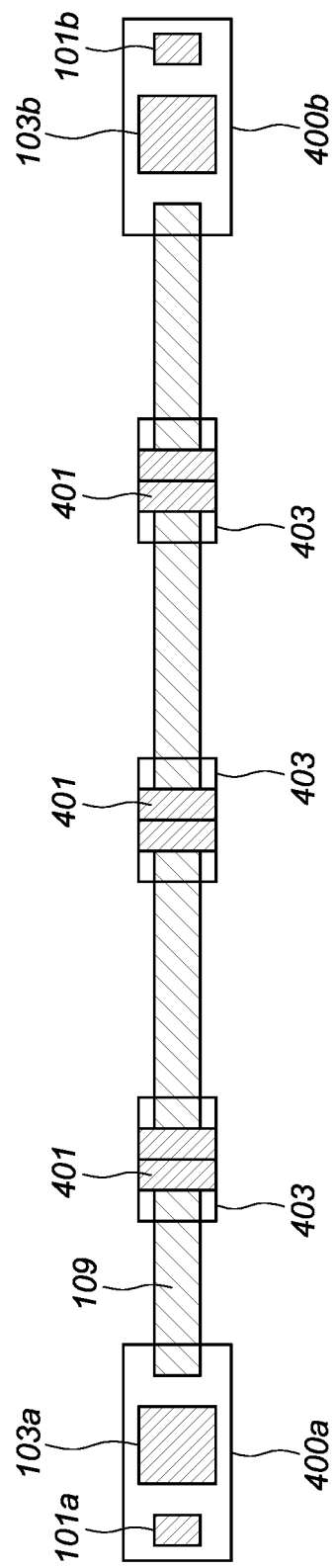
FIG. 4 shows a parallel optical interconnect having multiple multicore optical fibers joined by junctions, in accordance with aspects of the invention.

FIG. 4 shows parallel optical interconnect transceiver assemblies 400a,b having multiple multicore optical fiber 109 that are joined by junction. In some embodiments of a parallel optical interconnect, each fiber connection between modules 400a, b may comprise multiple multicore optical fiber segments, with for example some of the segments joined by junctions, where each junction between two multicore optical fiber segments comprises an optical connector 401 terminating each of the two fiber ends and a connector sleeve 403 that accurately aligns the two fiber ends.

Figure 5:
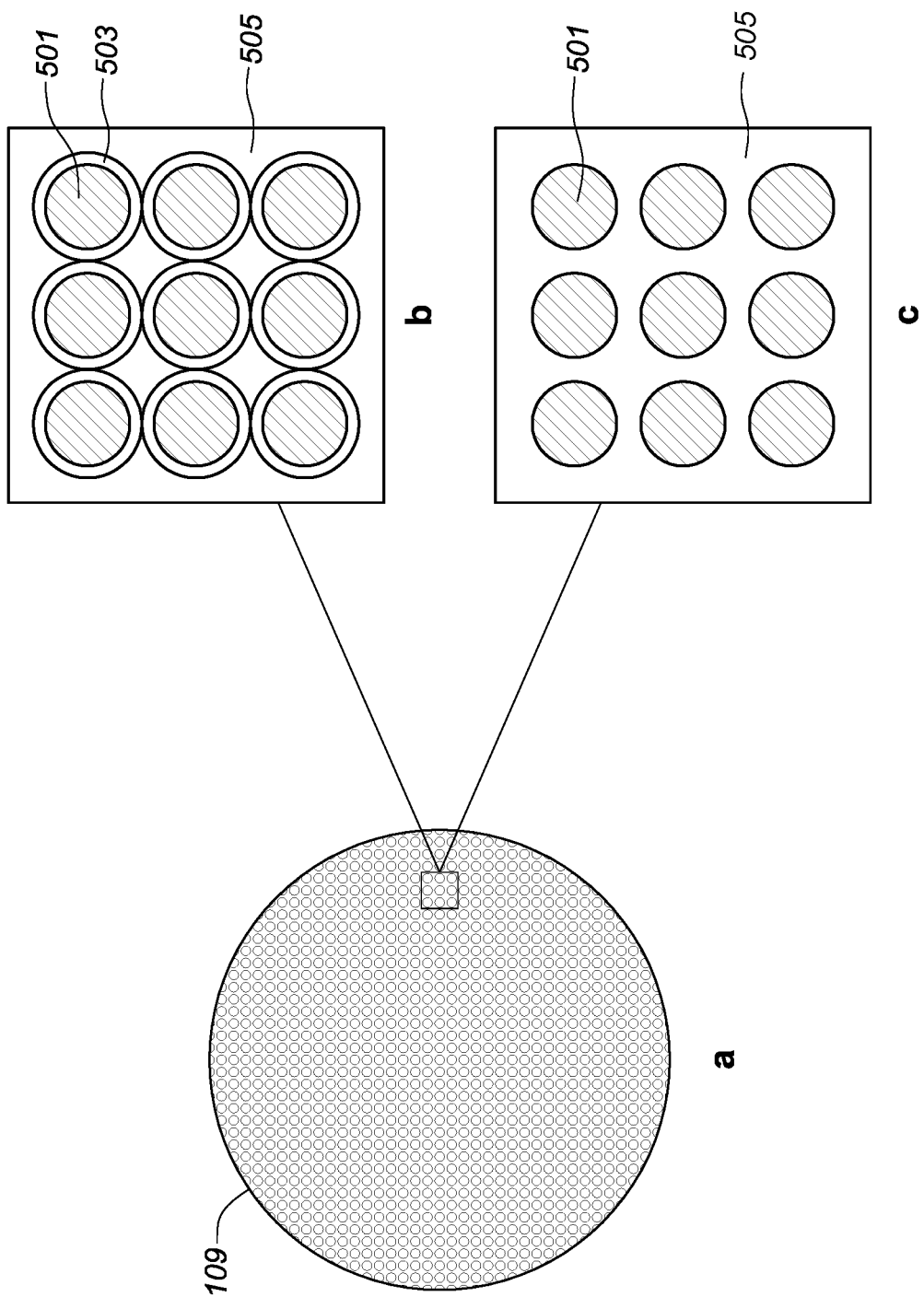
FIG. 5 shows a cross-sectional views of a multicore optical fiber, with alternative exploded views, in accordance with aspects of the invention.

FIG. 5 shows a cross-sectional view of a multicore optical fiber 109. A multicore optical fiber comprises multiple cores, lengths of each of which surrounded by cladding, where the index of refraction of the core is higher than that of the cladding. In some embodiments, the relative positions of the cores are retained on the two fiber ends, which is referred to as "coherent" multicore optical fiber. In some embodiments, the cross-section of each core is approximately circular. In some embodiments, the cross-section of each core is approximately square. In some embodiments, the cross-section of each core is approximately hexagonal.

Figure 6:
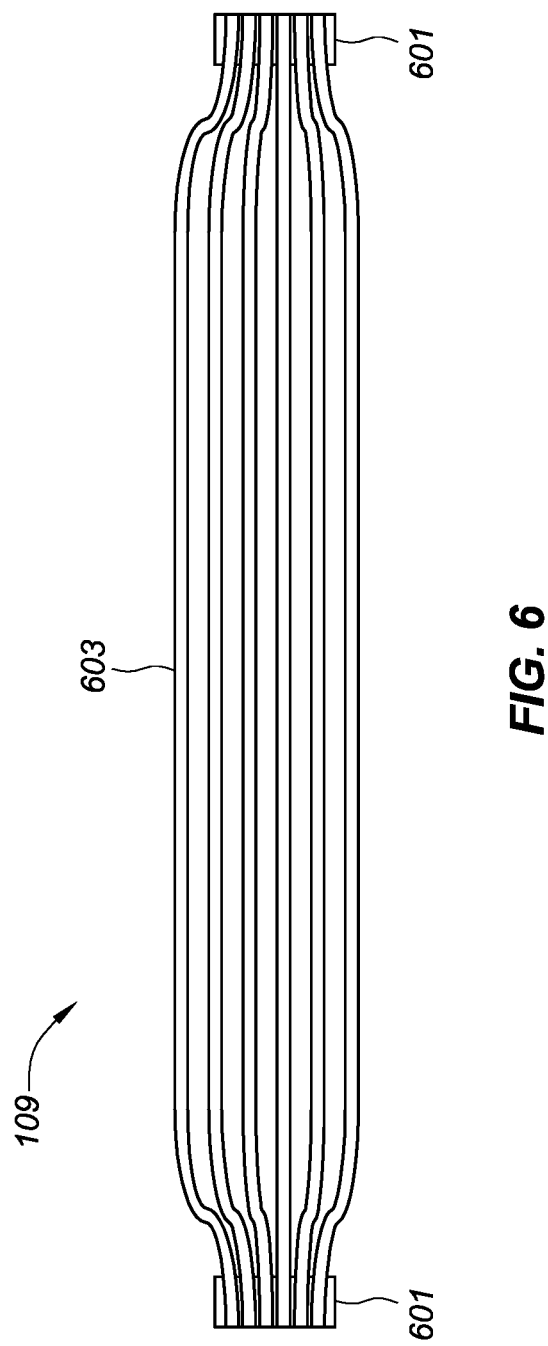
FIG. 6 shows fiber elements of a multicore optical fiber, in accordance with aspects of the invention.

FIG. 5 also shows a close-up view of different examples of the multicore optical fiber 109. In some embodiments, the multicore optical fiber comprises a "bundle" of multiple fiber elements, where each fiber element comprises a core 501. In some embodiments each core is surrounded by a concentric cladding 503, as shown in a first exploded cross-section b, which also shows the cores as being closely packed. In some embodiments, the cores are not closely packed, for example as shown in a second exploded cross-section c. In some embodiments, the space between the fiber elements may contain some filler material 505, while in other embodiments the space between fiber elements is empty. FIG. 6 shows the fiber elements 603 of the multicore optical fiber. In some embodiments, the fiber elements are attached to each other only at the ends of the fiber, also known as the fiber bundle region 601, and are unattached "loose" fiber elements between the ends.

In some embodiments, the multicore optical fiber comprises multiple cores surrounded by cladding that fills all of the space between the cores, as shown in FIG. 5C. In some embodiments, the diameter of the cores is in the range of 25 um to 50 um. In some embodiments, the ratio of the core diameter to the center-to-center spacing of the cores is >80%.

Figure 7B:
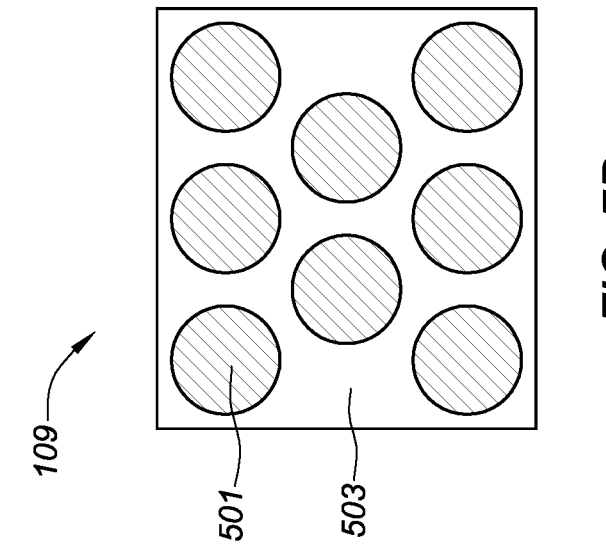
FIGS. 7A-B show different packing arrangements of cores of a multicore optical fiber, in accordance with aspects of the invention.
Figure 7A:
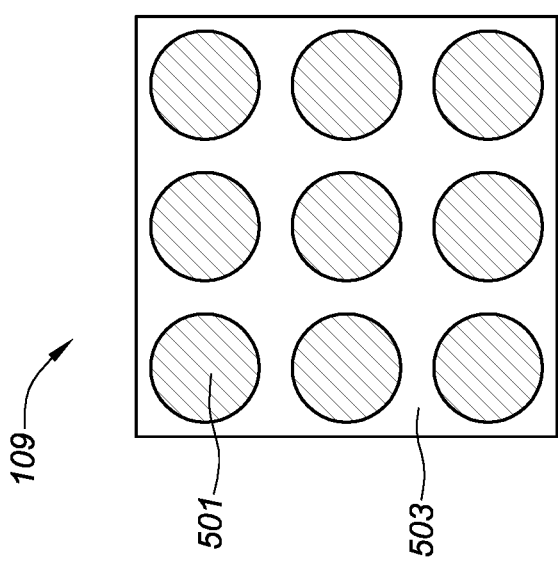

FIGS. 7A-B show the different arrangements of the cores of the multicore optical fiber. In some embodiments of a multicore optical fiber, the cores are located on a regular geometric grid. In some embodiments, this grid is square, as shown in FIG. 7A. In some embodiments, the cores are in a hexagonal close-packed (HCP) configuration such that they lie on an equilateral triangular grid, as shown in FIG. 7B. In some embodiments, the cores of a multicore optical fiber are not on a regular grid.

Figure 8B:
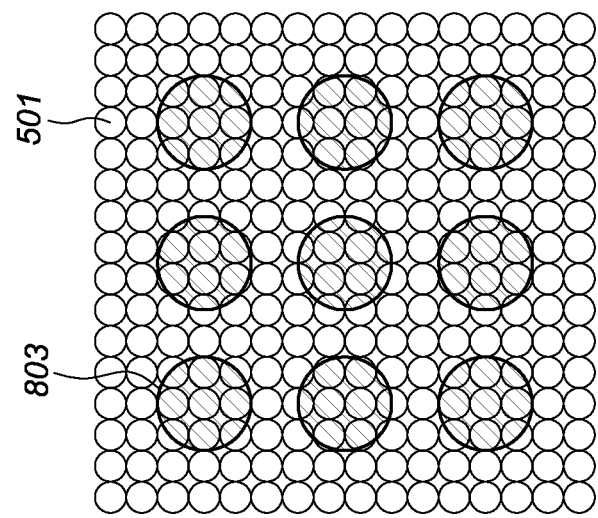
FIGS. 8A-B show relations of optical distribution channels and cores of a multicore optical, in accordance with aspects of the invention.
Figure 8A:
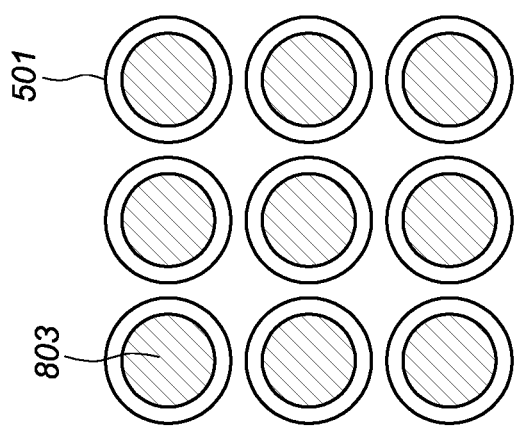

FIGS. 8A-B show the different relations that the optical distribution channels 803 and the cores of the multicore optical fiber can have. In some embodiments of a parallel optical interconnect, each transmitter is coupled to a single core in a multicore optical fiber and light from a single core is coupled to each receiver, as shown in FIG. 8A. In some embodiments of a parallel optical interconnect, each transmitter is coupled to a multiple cores in a multicore optical fiber and light from multiple cores is coupled to each receiver, as shown in FIG. 8B.

In some embodiments, both the core and cladding are made from glass, for instance $SiO_2$ or $SiO_2$ with added dopants. In some embodiments, the core is made from glass and the cladding is made from polymer.

In some embodiments, both the core and cladding are made from polymer; this is referred to as a multicore plastic optical fiber (MCPOF). In some embodiments of a MCPOF, the core is made from polymethylmethacrylate (PMMA) core and the cladding is made from fluoropolymer.

In some embodiments, the multicore optical fiber is butt-coupled to the transceiver array.

Figure 9B:
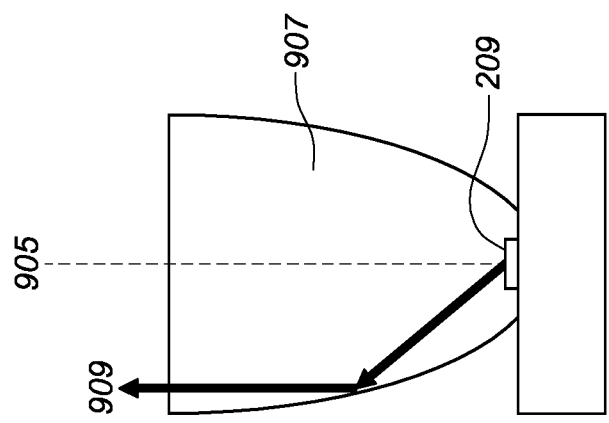
FIGS. 9A-B show examples of light emitted by a microLED as directed by optical collector elements, in accordance with aspects of the invention.
Figure 9A:
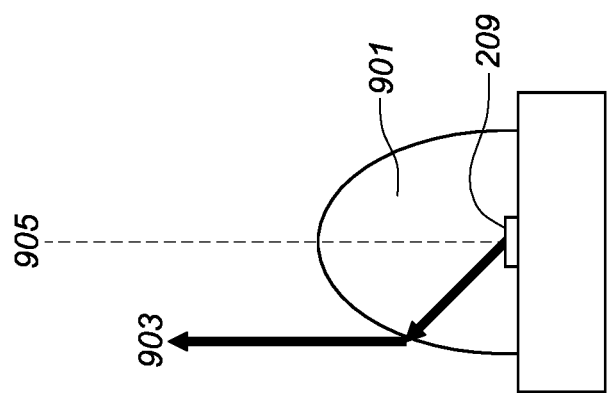

FIGS. 9A-B show examples of light being transmitted by the microLED through different types of optical collector elements. In some embodiments, there is an optical collector element for each emitter that is part of a transmitter, where the optical collector element collects the emitted light from the emitter into a smaller angular cone, for example for coupling into optical fiber. In some embodiments, each optical collector element comprises a refractive element 901, and the refractive element may encapsulate the emitter element 209, as shown in FIG. 9A. The refractive element may have an approximately spherical surface, or may have an aspheric surface. The refractive element has a shape and/or optical properties such that refracted light 903 from the emitter is collected into a smaller angular cone. Collection of light into a smaller cone can significantly improve optical coupling efficiency into a fiber core with a limited numerical aperture (NA).

In some embodiments, each optical collector element comprises a reflector 907, for instance an approximately parabolic reflector that causes light emitted at an angle relative to the normal axis 905 to the emitter to be reflected into light 909 at an angle closer to the normal axis, as shown in FIG. 9B.

Figure 10B:
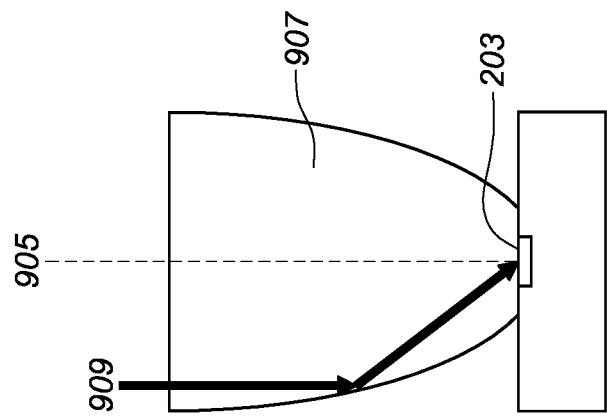
FIGS. 10A-B show examples of light received by a photodetector as directed by optical collector elements, in accordance with aspects of the invention.
Figure 10A:
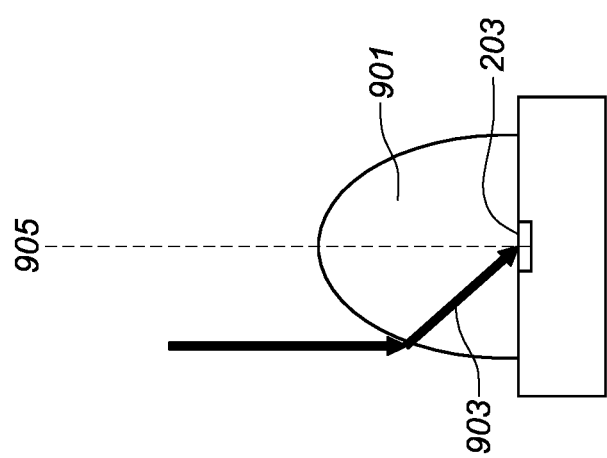

FIGS. 10A-B show examples of light being received by the photodetector through different types of optical collector elements. In some embodiments, there is an optical collector element for each detector 203 that is part of a receiver, where the optical collector element collects the light incident on it into a smaller spot. In general, the optical collector element collects light from the optical fiber, and directs the collected light onto the detector. In some embodiments, each optical collector element comprises a refractive element 901, as shown in FIG. 10A. In some embodiments, each optical collector element comprises a reflector 907, for instance an approximately parabolic reflector that causes light 909 incident on it to be collected onto a detector, as shown in FIG. 10B.

Figure 11:
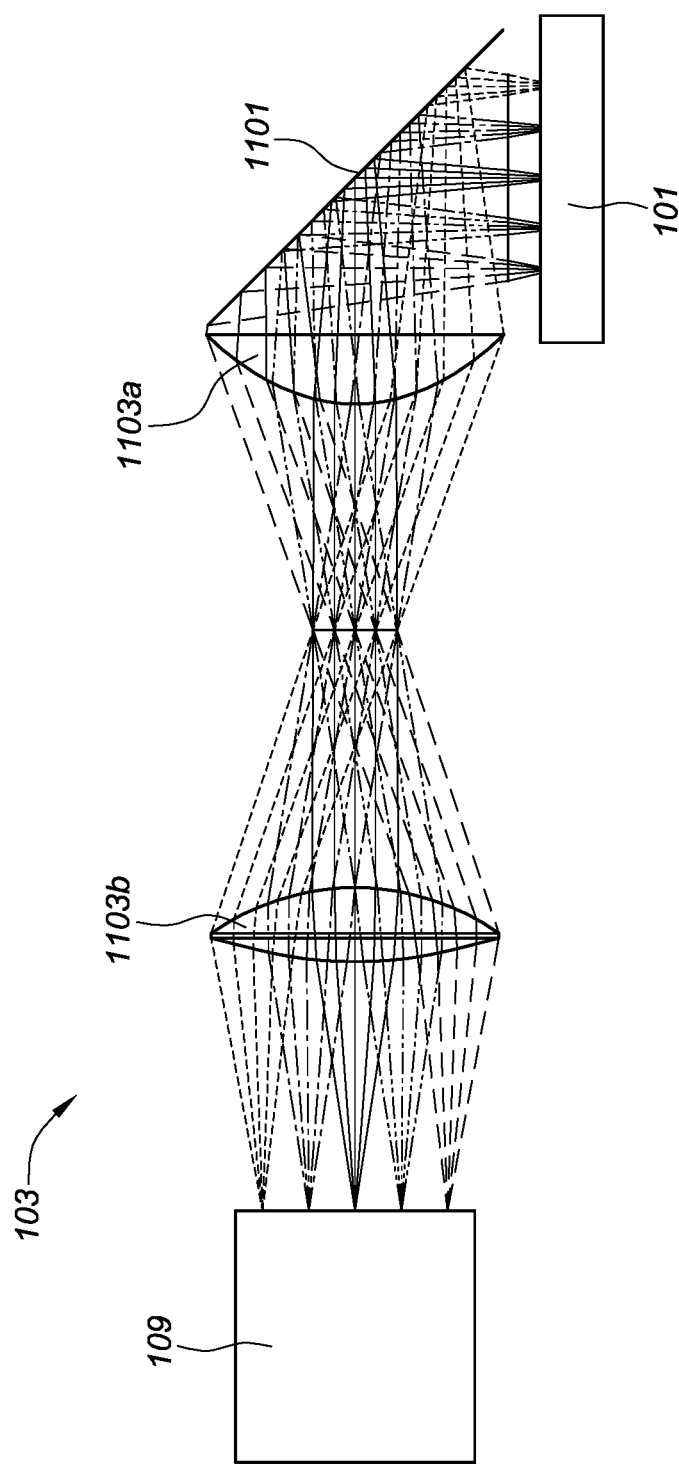
FIG. 11 shows an optical coupling assembly having mirror and lenses optically coupling a transceiver array and a multicore optical fiber, in accordance with aspects of the invention.

FIG. 11 shows an optical coupling assembly 103 having mirror and lenses connecting the transceiver array 101 to the multicore optical fiber 109. In some embodiments, an optical coupling assembly is interposed between the transceiver array and multicore optical fiber. In some embodiments, the optical assembly comprises one or more refractive elements such as lenses 1103a, b and/or one or more reflective elements 1101. FIG. 11 shows an optical coupling assembly comprising a 45° mirror and two lenses, which images an optical transceiver array onto the face of a multicore optical fiber.

In some embodiments, the optical coupling system comprises an imaging system that images the emitter and detector elements of the transceiver array onto the face of the multicore optical fiber with a magnification M. In some embodiments, the magnification M=1. In some embodiments, the magnification M is greater than 1 or less than one.

Some embodiments of an optical coupling system comprise a single lens. Some embodiments of an optical coupling system comprise two or more lenses. Some embodiments of an optical coupling system comprise some combination of lenses, flat mirrors, and curved mirrors. Such systems may image the transceiver array onto the end face of the multicore optical fiber with some magnification M and may turn an angle, such as is shown in FIG. 11 where the beam is turned 90° by a mirror.

Figure 12:
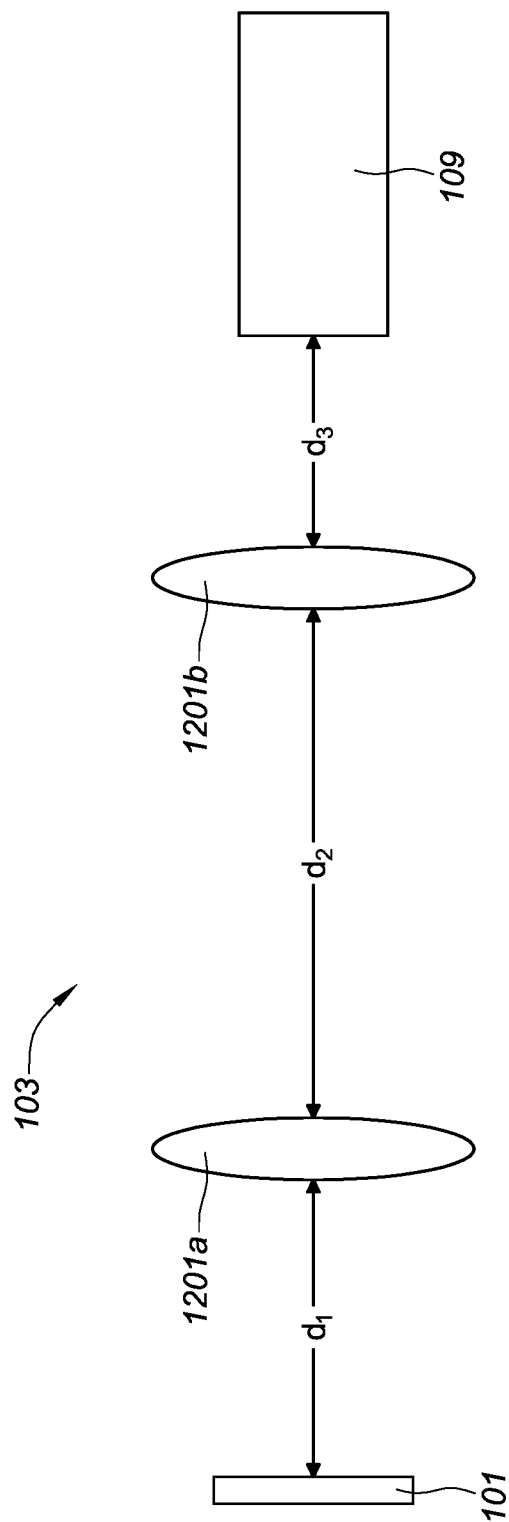
FIG. 12 shows an example of optical spacing for an optical coupling assembly, in accordance with aspects of the invention.

FIG. 12 shows an optical coupling system 103 comprising two lenses 1201a, b with focal lengths $f_a$ and $f_b$, respectively. The lens with focal length $f_a$ is separated from the transceiver array by a distance $d_1$, and the lens with focal length $f_b$ is separated from the multicore optical fiber endface by $d_3$. The two lenses are separated by a distance $d_2$. In a "4f" imaging configuration, $d_1=f_a$, $d_2=f_a\ f_b$, and $d_3=f_b$. The 4f configuration has a magnification $M=f_b/f_a$.

In some embodiments, the magnification M of the optical coupling system can be changed, for instance by changing $d_1$, $d_2$ and $d_3$ in FIG. 12. Variable magnification may be useful during the process of assembling the various parts of the parallel optical interconnect system, and can be used to adjust for component variances. For instance, if the diameter of the multicore optical fiber and/or the width of the transceiver array varies significantly from its nominal design value, the magnification in imaging from the transceiver array to the multicore optical fiber can be adjusted to account for this variation, such that each transceiver array element is efficiently coupled to the intended multicore optical fiber core(s).

For example, certain commercially-available plastic multicore optical fibers have an outer diameter tolerance of 1.0 mm+/−0.06 mm. It is typically possible to fabricate a transceiver array with much smaller tolerances, for instance 1.0 mm+/−0.005 mm. The nominal magnification spec may be M=1, corresponding to the fact that the nominal multicore optical fiber and transceiver array diameters are both 1.0 mm The worst case scenarios are a minimum diameter transceiver array being imaged to a maximum diameter fiber, and a maximum diameter transceiver array being imaged to a minimum diameter fiber. These diameter variances can be accommodated if the magnification can be adjusted over a range of $M_{min}=(0.94/1.005)=0.935$ to $M_{max}=(1.06/0.995)=1.065$. Changing M for a 4$f$ imaging system by these modest amounts (<10%) typically requires changing $d_1$, $d_2$, and $d_3$ by comparable percentages. M can be measured in real time with a machine vision system and simple algorithms can be used to change $d_1$, $d_2$, and $d_3$ to achieve the target value of M.

Although the invention has been discussed with respect to various embodiments, it should be recognized that the invention comprises the novel and non-obvious claims supported by this disclosure.

What is claimed is:

1. A parallel optical interconnect assembly for optically coupling integrated circuits, comprising:
    a first optical transceiver array incorporated with a first integrated circuit, the first optical transceiver array having a first plurality of optical transmitters and a first plurality of optical receivers;
    the first plurality of optical transmitters each having a drive circuit connected to a first microLED, each first microLED bonded to the first integrated circuit;
    the first plurality of optical receivers each having a first photodetector connected to a receiver circuit, each first photodetector bonded to the first integrated circuit;
a multicore optical fiber configured to transmit light emitted by each first microLED of the first plurality of optical transmitters;
    a first optical coupling assembly to couple light from each first microLED to a first end of the multicore optical fiber and light from the first end of the multicore optical fiber to each first photodetector, the first optical coupling assembly having a first refractive lens separated from the first optical transceiver array by a first distance equal to a first focal length of the first refractive lens, a second refractive lens separated from the first end of the multicore optical fiber by a second distance equal to a second focal length of the second refractive lens, with the first and second refractive lenses being separated from each other by a third distance equal to the first distance and the second distance combined;
    a second optical transceiver array incorporated with a second integrated circuit, the second optical transceiver array having a second plurality of optical transmitters and a second plurality of optical receivers;
    the second plurality of optical transmitters each having a drive circuit connected to a second microLED, each second microLED bonded to the second integrated circuit;
    each of the second plurality of optical receivers having a second photodetector connected to a receiver circuit, each second photodetector bonded to the second integrated circuit; and
    a second optical coupling assembly to couple light from each second microLED to a second end of the multicore optical fiber and light from the second end of the multicore optical fiber to each second photodetector;
    wherein each first microLED of the first plurality of optical transmitters and each second photodetector of the second plurality of optical receivers are coupled to multiple cores of the multicore optical fiber.

2. The parallel optical interconnect assembly of claim 1, wherein the first optical coupling assembly further comprises a reflecting element between the first optical transceiver array and the first refractive lens.

3. The parallel optical interconnect assembly of claim 2, wherein the reflecting element is a turning mirror orientated 45 degrees relative to a normal axis of each first microLED of the first plurality of optical transmitters.

4. The parallel optical interconnect assembly of claim 1, wherein the multicore optical fiber comprises at least two segments that are joined by a junction.

5. The parallel optical interconnect assembly of claim 4, wherein the junction comprises an optical connector and a connector sleeve.

6. The parallel optical interconnect assembly of claim 1, wherein the multicore optical fiber comprises a bundle of multiple fiber elements, each fiber element having a core surrounded by cladding.

7. The parallel optical interconnect assembly of claim 1, wherein the multicore optical fiber comprises a bundle of multiple fiber elements, each fiber element having a core surrounded by a concentric cladding.

8. The parallel optical interconnect assembly of claim 7, wherein a space between the multiple fiber elements contains a filler material.

9. The parallel optical interconnect assembly of claim 7, wherein a space between the multiple fiber elements is empty.

* * * * *